Figure 1:
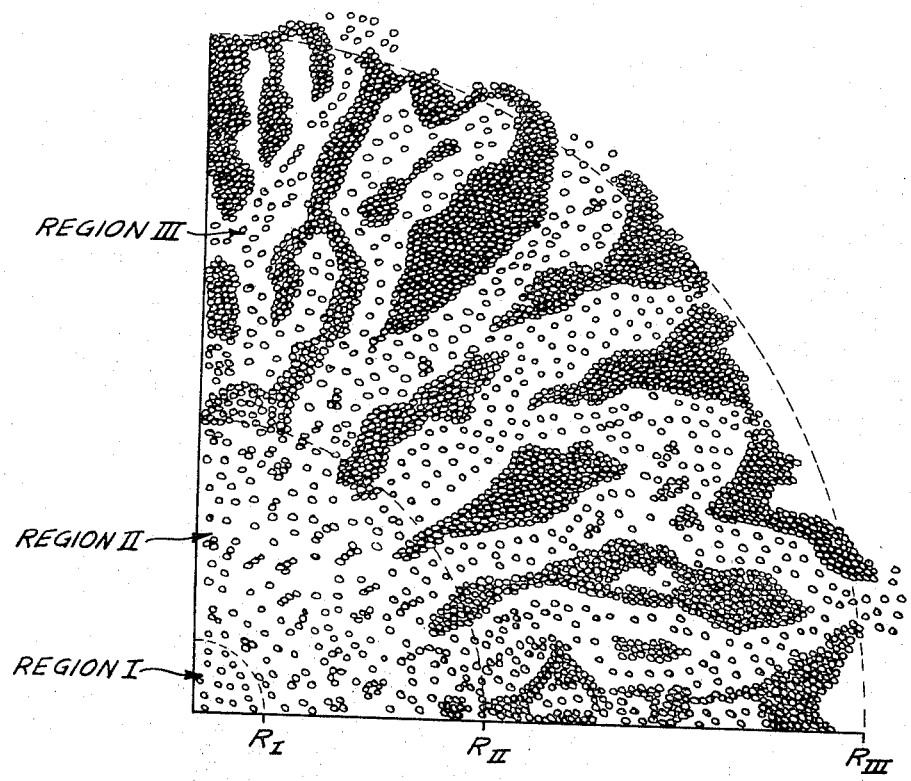

INVENTORS
JIMMIE L. HUITT &
DONALD K. LOWE

INVENTORS
JIMMIE L. HUITT &
DONALD K. LOWE

United States Patent Office 3,349,851
Patented Oct. 31, 1967

3,349,851
FRACTURING PROCESS
Jimmie L. Huitt, Glenshaw, and Donald K. Lowe, Parker Township, Butler County, Pa., assignors to Gulf Research & Development Company, Pittsburgh, Pa., a corporation of Delaware
Filed Nov. 2, 1965, Ser. No. 506,088
7 Claims. (Cl. 166—42)

This invention relates to a method of fracturing subsurface formations penetrated by wells, and more particularly to a method of propping such fractures open to create fractures of high fluid flow capacity.

Hydraulic fracturing has been used in more than 400,000 wells to increase the rate of flow of fluids from subsurface formations into the wells. In the hydraulic fracturing method, a liquid is pumped down a well and into contact with an exposed subsurface formation. The pressure on the liquid is increased until the exposed formation breaks down. A liquid having particles of propping agent suspended in it is displaced into the fracture to deposit the propping agent in the fracture to hold the faces of the fracture apart when the pressure on the liquid is released.

In a preferred fracturing method designed to give fractures of high flow capacity, the propping agent is deposited in the fracture in a partial monolayer to provide relatively large spaces between individual particles of the propping agent through which the formation liquids can flow to the well. In U.S. Patent No. 3,121,464 which issued on Feb. 18, 1964, the deposition of propping agent in a monolayer is accomplished by sealing the faces of the fracture ahead of the liquid carrying the propping agent and pumping liquid, which contains a controlled propping agent concentration, at a high rate into the fracture.

We have found that as the carrying liquid containing propping agent flows through the well, the propping agent tends to lag behind the liquid. At substantial distances from the well, the velocity of the carrying liquid decreases and particles of propping agent are deposited to form dunes. As pumping of the liquid continues, flow channels are broken in the dunes, but the liquid within the dunes is substantially stagnant. The flow capacity of the fracture in the area of dune formation is largely dependent upon the channels.

One method of causing the formation of dunes of propping agent in a fracture at a greater distance from the well is to increase the capacity of pumps used in the fracturing process. The resultant higher velocity of the carrying liquid delays the formation of the dunes until the velocity of the carrying liquid, because of the radial flow plan and leak off of liquid into the formation, has dropped to a range at which dune formation occurs. Pump rental is a principal part of the total cost of fracturing operations, and it is desired to produce fractures of high flow capacity by less expensive means than increasing the pump capacity.

This invention resides in a method of obtaining fractures of high flow capacity in which a fracture is created in a subsurface formation penetrated by a well and a monolayer of propping agent particles is deposited in the fracture from the well into the region where dune formation commences. A liquid free of propping agent is then displaced into the fracture to wash and enlarge channels through the dunes, and that liquid is followed with a carrying liquid having propping agent particles suspended in it to deposite propping agent particles in the channels in the fracture adjacent the well.

Figure 3:
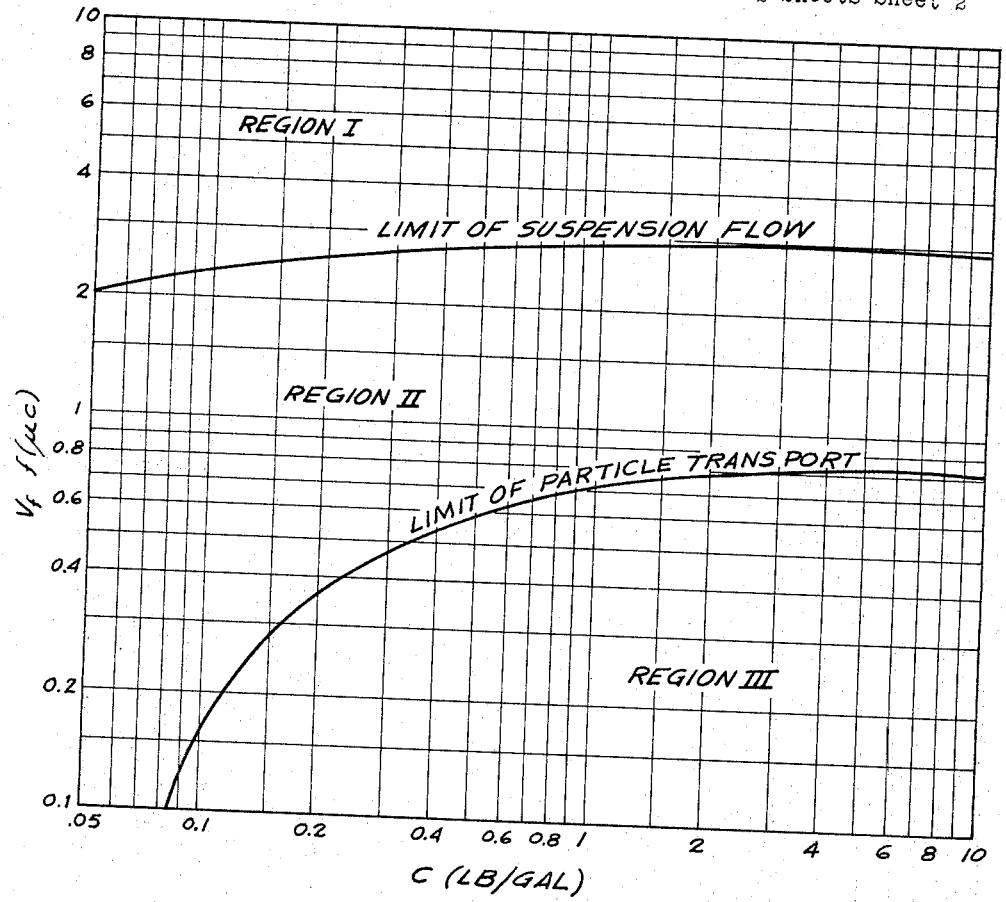
Figure 2:
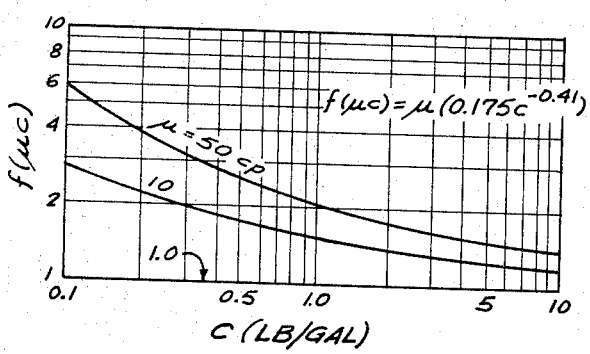

In the drawings:

FIGURE 1 is a diagrammatic illustration of the pattern in which propping agent particles are deposited in a horizontal fracture;

FIGURE 2 is a curve useful in determining the radius at which dune formation begins in which a function of the viscosity of the carrying liquid in centipoises and propping agent concentration in pounds per gallon is plotted against concentration of propping agent in pounds per gallon of carrying liquid; and FIGURE 3 is a curve showing the relationship between the particle concentration and the product of the velocity in feet per second and the function of the viscosity of the carrying liquid and particle concentration determined from FIGURE 2 for use in determining the radial distance at which the dune formation begins.

In an extensive experimental program, we have found that the flow capacity of fractures propped with a partial monolayer of propping agents can be increased by displacing a slug of liquid free of propping agent into the fracture after the major part of the propping agent is displaced into the fracture. The slug of propping agent free liquid is followed by liquid containing propping agent to prop fractures near the well. In the experimental program, slurries of carrying liquid containing a wide variety of propping agents were pumped through a liner flow cell made up of lucite plates one inch in thickness and having a size permitting a viewing section 11 feet long and 10 inches wide. Spacing between the plates was adjustable to give simulated fracture widths of $1/16$ to $1/2$ inch. The test cell was arranged to permit it to be tilted at an angle of as much as 45° with the horizontal. A camera was mounted over the test cell to allow photographing of the flow through the cell and counting the particles to determine the particle concentrations in the flow stream. The carrying liquids tested had viscosity and yield points ranging from 0.70 to 60 centipoises and from zero to 0.50 lb./sq. ft., respectively, and densities ranging from 1.0 to 1.3 gm./ml. The propping agents tested had densities ranging from 1.2 to 14 gm./ml. and particle diameters ranging from 0.017 to 0.25 in. The propping agents tested were particles of plastic, black walnut shells, sand, glass, aluminum, steel, and tungsten carbide. A total of 850 data points were obtained in the test procedure, and each data point was an average of six successive velocity measurements.

Results of a study of propping agent particle distribution in a fracture are illustrated in FIGURE 1 of the drawings. The borehole wall of the well is at the lower left corner of FIGURE 1. In the region adjacent the well, identified as Region I, the individual particles are transported in suspension in the carrying liquid. The particles travel through Region I as individual particles. There is substantially no interference by one particle with movement of other particles, and there is no deposition of propping agent particles from the carrying liquid. The concentration of propping agent in the fracture is determined almost solely by the concentration in the liquid injected into the fracture.

The study of the velocity of the propping agent particles, particularly with reference to the velocity of the carrying liquid, showed that the ratio of the particle velocity to liquid velocity was dependent upon the angle of the fracture, the Reynolds number of the liquid flowing through the fracture, the particle density, and the ratio of the particle diameter to the fracture width. The shape factor of the particles as measured by the ratio of the longest diameter of the propping agent particles to the shorest diameter also influenced the velocity at which the particles were carried by the liquid. Because past experience has shown that particles having a low roundness and sphericity tend to plug the fractures, the shape of the particles does not permit sufficient variation to allow effective control of the particle velocity.

As the carrying liquid flows outwardly from the well, it enters an intermediate region, identified as Region II in FIGURE 1, in which the particles of propping agent join together and move through the fracture in bunches. The particles roll and bounce along the surface of the fracture rather than being transported by suspension in the liquid as in Region I. The particles interfere with one another as they move through the fracture, but there is no deposition of particles or building of dunes. In Region II, the particle concentration varies from point to point in the region and the local concentration may differ substantially from the injection concentration.

Continued outward flow of the carrying liquid results in reduction of the velocity of the liquid with consequent deposition of propping agent particles to form dunes of the particles initiated by the bundles or groups of propping agents in Region II. The deposited particles of propping agent are packed against one another in a substantially monolayer arrangement in the dunes. Carrying liquid with suspended propping agent particles flows through channels between adjacent dunes and deposits particles at the downstream side of the dunes. Continued injection of carrying liquid results in extension of the channels with particles of propping agent deposited to form continuations of dunes and forming a boundary of the channel. Liquid within the dunes is virtually stagnant. From time to time, the liquid breaks through the boundary and forms new channels. Carrying liquid flow through the channels was at a velocity high enough to maintain suspension transport, similar to that occurring in Region I, of the propping agent particles. Measurements of the flow capacity of the fracture showed that the flow capacity through wide channels through the dunes is higher than through a larger number of narrow channels.

The radius of the different regions of the fracture can be calculated by use of the charts illustrated in FIGURES 2 and 3 of the drawings. The concentration C in pounds per gallon in the fracture is known from the initial concentration in the carrying liquid and the calculated loss of liquid by leak off through the faces of the fracture. Knowing the concentration C and the velocity of the carrying liquid, the function of the concentration and viscosity plotted as the ordinate can be determined from FIGURE 2. Then, the product of the velocity in the fracture and the function of viscosity and concentration can be determined from FIGURE 3. Since the value of the function of the viscosity and concentration have been determined, the velocity of the fracture can be readily calculated at the limits of Region I and Region II from the readings taken from FIGURE 3. It is then possible to calculate the radius R–I and the radius R–II from the known rate of pumping fracturing liquid and the velocity at those radii. Determination of R–II allows designing the pumping schedule for a fracturing operation.

We have found that if a liquid devoid of propping agent, hereinafter referred to as a wash liquid, is displaced through the fracture after the formation of dunes in Region III, identified in FIGURE 1, the wash liquid picks up particles of propping agent along the boundary of the channels between the dunes and widens the channels to increase the fluid carrying capacity of the fracture. For most effective widening of the channels through the dunes, the wash liquid should have a viscosity of at least 10 centipoises. The widening of the channels through the dunes and the reduced resistance to flow of the wash liquid decrease the pressure drop of the liquid flowing through the fracture and allow extension of the fracture for larger radial distances. Eventually particles of propping agent picked up by the wash liquid are deposited at a point radially beyond the outer boundaries of the original dunes to increase the area of the fracture that is propped. Flow through Region I and Region II is in a line from the well to the channels through Region III.

Following the washing of the fracture with the wash liquid, carrying liquid containing propping agent is then pumped into the fracture to deposit propping agent at low concentration in the passages washed by the wash liquid. It is preferred that the final propping agent be of the same or larger size than the original propping agent to increase further the fluid carrying capacity of the fracture. The liquid used as carrying liquid for transporting the propping agent will be a satisfactory wash liquid and can be used most conveniently. The wash liquid should have a viscosity of at least 10 centipoises.

The process of this invention can be used in any fracturing method used to create fractures and prop them open with a partial monolayer of propping agent. It is particularly advantageous to increase the flow capacity of substantially horizontal fractures, but, as indicated by the experimental work, is useful in increasing the flow capacity of fractures sloping at 45° or more with the horizontal. A preferred method of creating fractures and propping them with a monolayer is described in U.S. Patent No. 3,121,464.

In the preferred method, it is frequently advantageous to displace a small volume of a liquid such as a 15 percent aqueous solution of hydrochloric acid down the well and into the formation to be fractured. The hydrochloric acid solution is particularly advantageous in fracturing limestone formations. When the fracture is created through perforations, or through a slot in casing set through the formation to be fractured, the hydrochloric acid is also useful in removing cement particles from within the casing. The initial slug of acid while aiding in the breakdown of the formation is not essential and will not be used in many fracturing jobs using this invention.

The acid is followed with a break-down liquid which offers sufficient resistance to flow into the formation to allow pressure adequate to break down the formation to be built up in the well. Frequently, crude oil available at the wells is a satisfactory break-down liquid. The crude oil can be thickened with a suitable commercial thickening agent, such as a soap, to increase its viscosity and thereby increase the resistance to penetration of the formation. If a water-base break-down liquid is used, it is desirable to thicken it by the incorporation of a thickening agent such as guar gum, Karaya gum or batu gum. The break-down liquid may contain a material adapted to prevent fluid loss by the formation of a seal on the face of the formation. Commercial thickeners containing guar gum often are water-loss additives as well as thickening agents.

The break-down liquid is followed by a sealing liquid which may be a water- or oil-based liquid containing a fluid-loss reducing additive to form a seal of low permeability on the faces of the fracture and thereby greatly reduce leak off of liquid from the fracture. A preferred fluid-loss reducing additive is silica flour. Another suitable fluid-loss reducing composition is described in U.S. Patent No. 2,779,735 which was issued Jan. 29, 1957. The sealing liquid may be the same as the break-down liquid or may be a separate liquid. Both the break-down liquid and the sealing liquid are devoid of propping agent.

Sealing liquid is displaced into the fracture in an amount sufficient to seal the faces of the fracture for the desired radius of the fracture. As the sealing liquid moves outwardly through the fracture, a portion of the liquid is lost into the formation and that sealing liquid not lost is pushed outwardly in the fracture by the following liquid. Core samples of the formation permit calculation of the volume of sealing liquid required to seal the faces of the fracture over the desired radius.

A carrying liquid having particles of propping agent suspended in it is displaced into the fracture at a rate of at least 10 barrels per minute behind the sealing liquid. It is preferred that the carrying liquid containing the propping agent not be displaced into the well until a pressure break has occurred to make sure that there will not be a screen-out of propping agent at the exposed face of the formation to be fractured. When fractures are to be made in deep formations, the volume of the well bore may be substantially larger than the required volume of sealing liquid, and it may be possible to start pumping carrying liquid before a pressure break occurs. In formations which have been previously fractured from other wells and on which sufficient information is available, the carrying liquid containing the propping agent usually may be displaced into the well before a pressure break occurs with confidence that a fracture will be created before the propping agent reaches the level of the fracture. Ordinarily, the carrying liquid is a liquid having a viscosity of 10 centipoises or more to aid in suspending the propping agent and carrying it through the fracture.

The propping agent is suspended in the carrying liquid in a concentration in the range of 0.1 to 5 pounds per gallon and preferably in the range of 0.2 to 2 pounds per gallon. The particles of propping agent should have a narrow range of sizes spanning not more than 5 numbers in the U.S. Sieve Series. It is desirable that the particles of propping agent be larger than 20 mesh in the U.S. Sieve Series and preferably in the range of 8 to 12 mesh or larger. Preferred propping agents are glass beads of the type described in U.S. Patent No. 3,175,616. Particles of black walnut shells are also effective propping agents. The particles should have a high roundness and sphericity to aid in their transportation through the fracture. A narrow range of particle size is also advantageous in delaying dune formation and aiding transport of the particles through the fracture to give a fracture of high flow capacity. The carrying liquid is displaced into the fracture for a period adequate to deposit propping agent over a radial distance at least as large as distance R–II for the particular propping agent, viscosity of the carrying liquid, and propping agent concentration.

The carrying liquid is followed by a slug of wash liquid which is displaced at a rate of at least 10 barrels per minute into the fracture to wash particles of propping agent from the boundaries of the channels between the dunes of propping agent. The wash liquid is followed by additional carrying liquid containing propping agent. The volume of carrying liquid in the final slug is substantially the same as the volume of wash liquid, and the particle size and concentration of the propping agent is substantially the same as in the first volume of carrying liquid displaced into the fracture.

The final slug of carrying liquid containing the propping agent is followed by a volume of a displacing liquid devoid of propping agent adequate to displace the propping agent down the well to the level of the fracture. When a volume of displacing liquid slightly less than that required to displace all the propping agent down the well into the fracture has been displaced into the well, the well should be shut in and propping agent remaining in the well above the level of the fracture permitted to settle to the bottom of the well. Care should be taken to avoid washing propping agent from the fracture near the well by overflushing.

The relative volumes of the various liquid displaced into the well must be controlled for effectively increasing the flow capacity of a fracture by this invention. The volume of carrying liquid is determined by the desired radial extent of the fracture and the amount of propping agent required in the fracture to hold the fracture faces apart. The sealing liquid preceding the carrying liquid should range from a minimum of 10 to 20 percent of the volume of the carrying liquid, depending on the rate of pumping of the carrying liquid, to a maximum about equal to the volume of the carrying liquid. Larger volumes of sealing liquid can be used but will result in relatively little increase in fracture flow capacity and some waste of sealing liquid. At pumping rates of 10 barrels per minute, the minimum amount of sealing liquid should be approximately 20 percent of the amount of carrying liquid, while at a pumping rate exceeding 40 barrels per minute, 10 percent may be sufficient. The wash liquid following the carrying liquid should range from a minimum substantially equal to the minimum volume of the sealing liquid up to about the volume of the carrying liquid. The volume of the final carrying liquid should equal or be slightly larger than the volume of the wash liquid.

In a fracturing operation using the process of this invention in which glass beads $\frac{1}{16}$ inch in diameter are suspended in a water-base carrying liquid thickened to a viscosity of 10 centipoises and the concentration of the glass beads is approximately 1.0 lb./gal., the liquid is injected at a rate of 20 barrels per minute. R–I, the outer boundary of Region I, is 6.5 feet, and R–II, the outer boundary of Region II, is 25 feet.

First a fracture is initiated and then a spearhead of liquid amounting to 6300 gallons (25 percent of the total fluid injected into the fracture) and containing a fluid-loss reducing additive is pumped into the fracture to seal the fracture faces. Next, thickened water and propping agent are injected until 6300 gallons of slurry containing 6000 pounds of propping agent are displaced into the fracture at which time there are propping agent particles from the well bore out to a radius of about 70 feet. The fracture flow capacity in the Region III portion of the fracture as shown in FIGURE 1 is 9700 millidarcy feet and the over-all fracture flow capacity from the well bore to R–III is 23,000 millidarcy feet. The thickened water base liquid free of propping agent is injected until an additional 6300 gallons of liquid (25 percent of total fluid) are pumped into the fracture. This fluid washes and enlarges the existing channels in the Region III portion of the fracture. Next, an additional 6300 gallons of slurry (25 percent of the total injected fluid) which contains 6000 pounds of propping agent are injected into the fracture to extend the propped fracture radius out to approximately 100 feet. The flow capacity of the Region III portion of the fracture is increased to approximately 15,000 millidarcy feet. The over-all flow capacity of the fracture from the well bore to R–III is increased to approximately 35,000 millidarcy feet. The process of this invention causes a 50 percent increase in fracture flow capacity with the same amount of propping agent that would be used if all of the propping agent were displaced into the fracture in a single slug.

The volume of carrying liquid having a known concentration of propping agent suspended in it that can be displaced into the fracture before the propping agent begins to be deposited in dunes can be readily calculated. As shown by FIGURES 2 and 3, the volume of such carrying liquid will depend upon the viscosity of the carrying liquid, concentration of propping agent, and the pumping rate that is used in the particular fracturing procedure. By injecting a slug of liquid devoid of propping agent into the fracture and following that slug with additional liquid having propping agent suspended in it, the capacity of the fracture can be significantly increased without requiring additional pumping capacity.

We claim:

1. A method of treating a well to increase the flow capacity thereof comprising creating a fracture extending from the well into the surrounding formation, displacing a carrying liquid having a propping agent suspended therein at a rate to deposit a partial monolayer of propping agent and in a volume to cause deposition of dunes of propping agent in the outer portion of the fracture, thereafter displacing into the fracture a wash liquid devoid of propping agent to enlarge channels through the dunes, and following the wash liquid with additional carrying liquid and propping agent to deposit a monolayer of propping agent in the channels.

2. A method of treating a well as set forth in claim 1 in which the volume of the wash liquid is at least 10 percent of the volume of the carrying liquid displaced into the fracture ahead of the wash liquid.

3. A method of treating a well as set forth in claim 1 in which the wash liquid has a viscosity of at least 10 centipoises.

4. A method of treating a well to increase the flow capacity thereof comprising creating a fracture extending from the well into the surrounding formation, displacing a sealing liquid containing a fluid-loss reducing additive into the fracture to seal the faces thereof, thereafter displacing into the fracture a carrying liquid having a propping agent suspended therein, the concentration of the propping agent and the rate of displacement of the carrying liquid into the fracture being adapted to deposit a monolayer of propping agent in the fracture, the volume of carrying liquid being adequate to cause substantial monolayer dune formation in the outer portion of the fracture, thereafter displacing a wash liquid devoid of propping agent into the fracture at a rate to wash channels through the dunes, and thereafter displacing carrying liquid having propping agent suspended therein into the fracture to deposit a monolayer of propping agent in the channels.

5. In a method of treating a well to increase the flow capacity thereof in which a fracture is made to extend from the well into the surrounding formation and a propping agent is deposited in a substantial monolayer in the fracture with dunes of propping agent deposited in the outer portion of the fracture, the improvement comprising displacing into the fracture a wash liquid at a rate of at least 10 barrels per minute to enlarge channels through the dunes, and thereafter displacing into the fracture a carrying liquid having propping agent suspended therein to deposit propping agent in the channels.

6. A method of treating a well to increase the flow capacity thereof comprising displacing a liquid devoid of propping agent down the well and increasing the pressure thereon to break down the formation and create a fracture in the formation surrounding the well, displacing a sealing liquid devoid of propping agent down the well and into the fracture to seal the faces of the fracture, after break-down of the formation surrounding the well and injection of sealing liquid into the well displacing a carrying liquid having a propping agent suspended therein down the well and into the fracture to deposit a monolayer of propping agent in the fracture and form dunes of propping agent in the outer portion of the fracture, following the carrying liquid with a wash liquid devoid of propping agent to create and enlarge channels through the dunes, and following the wash liquid with a carrying liquid having propping agent suspended therein to deposit a monolayer of propping agent in the channels, the volume of the sealing liquid, the wash liquid, and the carrying liquid following the wash liquid ranging from 10 percent to approximately 100 percent of the volume of the carrying liquid preceding the wash liquid.

7. The method set forth in claim 6 in which the rate of displacement of the liquids into the fracture is at least 10 barrels per minute, the viscosity of the wash liquid is at least 10 centipoises, and the size of the propping agent is in the range of 8 to 20 mesh.

References Cited
UNITED STATES PATENTS

| | | | |
|---|---|---|---|
| 2,950,247 | 8/1960 | McGuire et al. | 166—42 X |
| 3,121,464 | 2/1964 | Huitt et al. | 166—42 |
| 3,164,208 | 1/1965 | McGuire et al. | 166—42 |
| 3,285,342 | 11/1966 | Cronberger | 166—42 |

CHARLES E. O'CONNELL, *Primary Examiner.*

STEPHEN J. NOVOSAD, *Examiner.*